(No Model.)

H. C. SEARS.
MEANS FOR OPERATING CAB DOORS AND WINDOWS.

No. 356,212. Patented Jan. 18, 1887.

UNITED STATES PATENT OFFICE.

HENRY C. SEARS, OF BOSTON, MASSACHUSETTS.

MEANS FOR OPERATING CAB DOORS AND WINDOWS.

SPECIFICATION forming part of Letters Patent No. 356,212, dated January 18, 1887.

Application filed March 19, 1886. Serial No. 195,795. (No model.)

*To all whom it may concern:*

Be it known that I, HENRY C. SEARS, of Boston, in the county of Suffolk and State of Massachusetts, a citizen of the United States, have invented a new and useful Improvement in Means for Operating Cab Doors and Windows, of which the following is a full, clear, and exact description, reference being had to the accompanying drawings, forming a part of this specification, in explaining its nature.

The invention relates to that class of vehicles known as "hansom-cabs;" and it comprises a movable front section or door and means for operating it from the driver's seat, and a movable upper front section or window and devices for operating it from the driver's seat.

It further relates to various details of construction, all of which will hereinafter be described.

Figure 2:
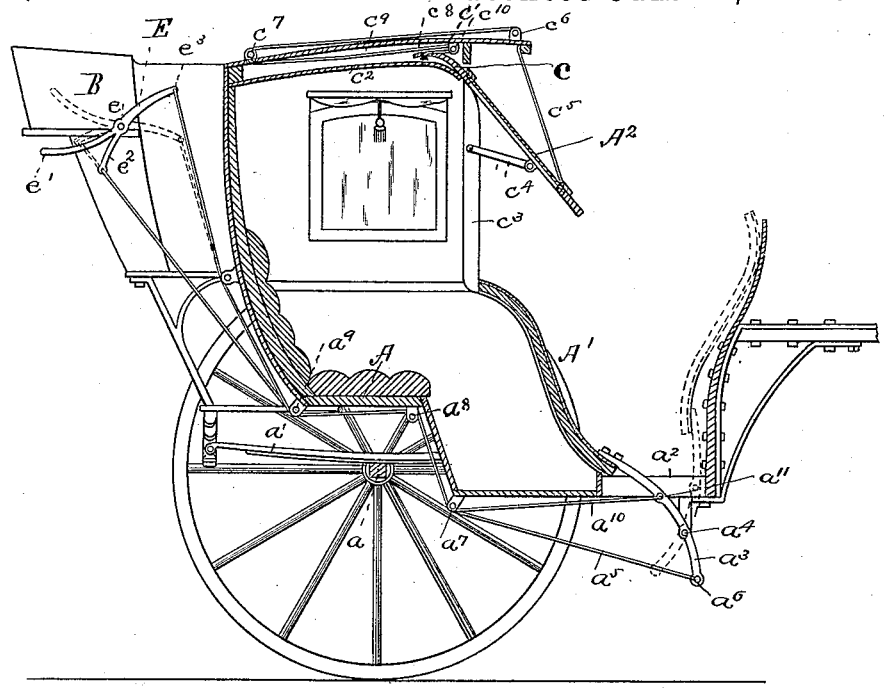
Figure 1:
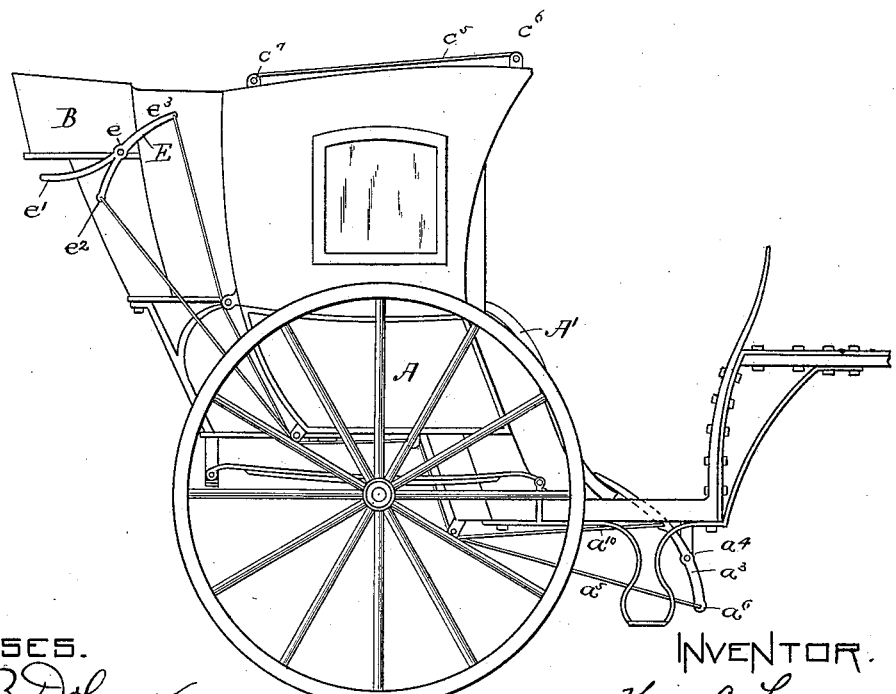

Referring to the drawings, Figure 1 is a side elevation of a hansom-cab having the features of my invention. Fig. 2 is a vertical central section thereof.

A represents the body of the vehicle; $a$, the axle; $a'$, the running-gear; A', the lower front section; A², the upper front section or window. The lower front section, A', has extending downward from its lower edge, through slots $a^2$ in the floor of the vehicle, metal arms $a^3$, which are pivoted at $a^4$ to brackets depending from the sills of the vehicle, and providing a construction whereby the section A' of the front may be moved outward against the dasher, and free entrance to the interior of the vehicle obtained. To operate or move this section A' out of and into a closed position from the driver's seat, I have connected the arm $a^3$, by means of cords, with the driver's seat, which is arranged at the back of the vehicle, near the top, as in the ordinary hansom-cab.

In the drawings, B represents the seat.

The cord $a^5$, for opening the vehicle, extends from the lower end, $a^6$, of one of the arms $a^3$, over the pulleys $a^7$ $a^8$ $a^9$, to the driver's seat; and the cord $a^{10}$, for closing the vehicle, extends from the point $a^{11}$ of one of the arms $a^3$, over pulleys arranged with the pulleys $a^7$ $a^8$ $a^9$, to the driver's seat.

It is obvious that upon pulling the cord $a^5$ the section A' is moved outward against the dasher, and that by drawing the cord $a^{10}$ the section A' is returned to close the front of the vehicle. This section A' may comprise the entire front section of the vehicle, or as much of it as desired.

The upper section, A², of the front is preferably a window, and its frame or sash is provided with the curved upper end, $c$, which extends or bears upon the rounded or curved entrance $c'$ to the horizontal pocket $c^2$, arranged at the top of the vehicle to receive the section A², as hereinafter described. The section A² is attached to the vertical side posts, $c^3$, of the vehicle-body by means of the links $c^4$, which are pivoted at their inner ends to the posts $c^3$, and at their outer ends to the sash or section A². These links $c^4$ are arranged to permit, and, in fact, assist, the turning movement of the section A² as it is being lifted from the front of the vehicle into its holding-pocket $c^2$, and they also serve to stay the section, and thereby prevent the binding or cramping action during the movement of the section. The section is adapted to be moved by the driver from the driver's seat both upwardly to open the front and downwardly to close it, and this is accomplished by means of cords attached to the section and extending to a position convenient to the driver. To open or lift the section A², I employ a cord, $c^5$, which is attached to the section A² at the lower end, and passes through the top of the vehicle, over the pulley $c^6$, to the pulley $c^7$ at the back of the top of the vehicle. To close it I extend from the upper end, $c^8$, of the section A² a cord, $c^9$, which extends frontward over the pulley $c^{10}$, then backward again to pulley $c^7$.

In the drawings I have shown the opening and closing cords as in one piece. It is obvious that upon the drawing of the cord $c^5$ backward the section A² will move upward, and by means of its rounded end $c$ and the rounded edge $c'$ of the pocket be guided into the pocket $c^2$—that is, it is turned from a vertical to a horizontal position—and that upon drawing the cord $c^9$ the movement of the frame is reversed.

Of course the side posts, $c^3$, of the vehicle are arranged to furnish proper guides or abutments against which the inner surfaces of the side edges of the section come in contact when the section is in a vertical position.

For the purpose of readily controlling the movement of the lower section, A', of the front, I have attached the pull-cords $a^5$ $a^{10}$ to the lever E, which is pivoted at $e$, adjacent to the driver's seat, and has the arm $e'$, which extends to a position where it can easily be grasped by the driver. The pull-cord $a^5$ is attached to the end $e^2$ of the lever, and the pull-cord $a^{10}$ to the end $e^3$ of the lever, and upon the movement of the lever in an upward direction the section A' is moved entirely away from the front of the body of the vehicle to the dasher, and upon the downward movement of the lever it is moved backward bodily to close the opening.

Of course the driver's seat B may be placed on some other part of the vehicle than that represented, and the devices for operating or moving the lower section, A', and upper section, A², extend to a convenient position, or, in fact, to any other position comparatively remote from the front of the vehicle, without departing from the spirit of the invention.

While I have shown and described the upper section, A², of the front as having a curved upper end, it is not essential that the end should be curved, for if the entrance to the pocket $c^2$ is made sufficiently deep the section A² will enter it as it is turned, without having its upper end curved.

Having thus fully described my invention, I claim and desire to secure by Letters Patent of the United States—

1. In a vehicle having a driver's seat behind the body thereof, the combination of the front section or door, A', hinged at its bottom, substantially as specified, and having the arm $a^3$, with the lever E, having the handle $e'$, and the cords $a^5$ $a^{10}$, connecting the arm $a^3$ with the ends of the lever E, substantially as described.

2. The combination of the body of the vehicle having a pocket or holding device, $c^2$, with the movable upper section, A², of the front, and the links $c^i$, substantially as described.

3. The combination of the section A², having the curved upper end, $c$, with the curved guide $c'$, substantially as described.

4. The combination of the upper front section, A², having the curved upper end, $c$, the recess or holding-pocket in the top of the vehicle for receiving and holding said section, having the curved guides $c'$, with the pull-cords $c^5$ $c^9$ and pulleys $c^6$ $c^{10}$, substantially as described.

HENRY C. SEARS.

Witnesses:
F. F. RAYMOND, 2d,
FRED. B. DOLAN.